Jan. 19, 1954

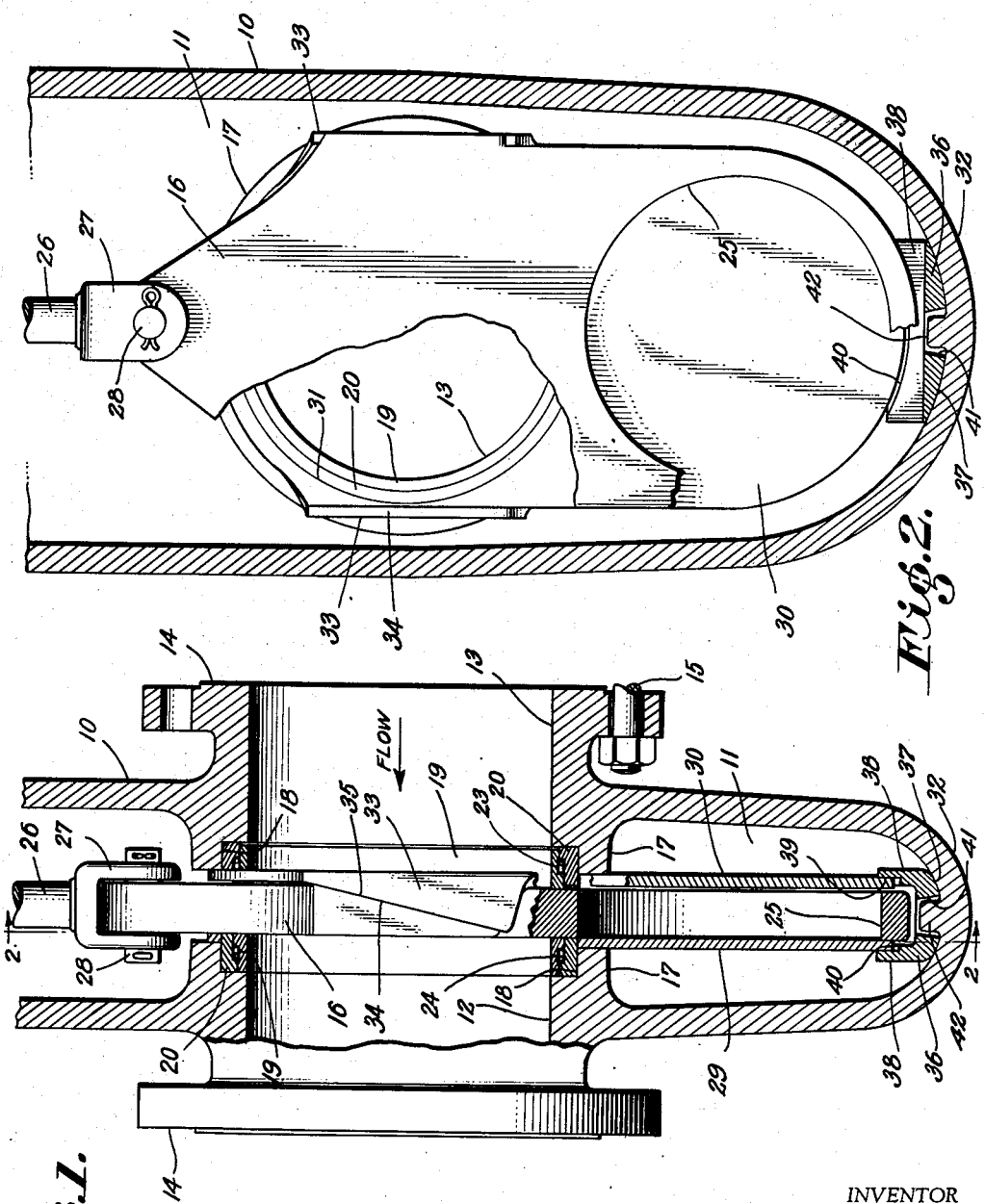

M. P. LAURENT 2,666,615

GATE VALVE

Filed April 10, 1950

INVENTOR
Milton P. Laurent
BY
ATTORNEY.

Patented Jan. 19, 1954

2,666,615

UNITED STATES PATENT OFFICE 2,666,615

GATE VALVE

Milton P. Laurent, Houston, Tex., assignor to W-K-M Company, a joint venture

Application April 10, 1950, Serial No. 154,911

6 Claims. (Cl. 251—68)

This invention relates to sliding gate valves and more particularly to a gate valve of the through conduit type which has a one-piece gate. By "through conduit" is meant that the valve, when open, presents a smooth walled, unbroken and unobstructed passageway for the flow of fluid through the valve.

Valves of this type present a problem in providing a satisfactory tight seal when the valve is closed. One construction which has been used to solve this problem consists in providing some form of wedging means to force the gate tightly against the downstream seat when the valve is closed. Known valve constructions embodying such means, however, involve a rather difficult machining problem because of space limitations.

There also exists, in such valves, the problem of preventing undue pressure rise of the fluid trapped in the housing when the valve is closed without permitting leakage to the downstream side of the valve. Such pressure rise may be caused, for example, by a temperature increase of the trapped fluid. Although, such pressure rise may reach dangerous proportions, this problem has, for the most part, been neglected in valve constructions commonly in use.

Through conduit gate valves are usually provided with flat, parallel, seat plates, or seat skirts, serving both to guide the valve gate in its movements to open and closed positions of the valve and to protect the port through the valve gate against the entrance of foreign matter when the valve is closed. These plates usually depend into the bottom of the valve housing without any support for their lower ends. In certain sizes of such valves, however, the lower ends of the seat plates have a tendency to flex away from the lower portion of the valve gate when the valve is closed, thus allowing foreign matter to enter the gate port and also providing inadequate guiding support for the gate. To overcome this tendency it has been proposed to provide opposed lugs or abutments integral with the valve housing, interiorly thereof, and bearing oppositely against the lower ends of the seat plates to maintain their proper spacing. While such lugs accomplish their intended purpose, they present a difficult machining problem because of their inaccessibility, since the bottom wall of the housing is usually a unitary part of the housing, i. e. cast integrally therewith. This problem is particularly acute in gate valves having a thin gate, i. e. wherein the distance between the opposed valve seats is small.

Accordingly, it is an object of this invention to provide a gate valve of the through conduit type which has a one-piece gate with simplified means, removable from the valve housing, for forcing the gate against the downstream valve seat when the valve is closed, such removability serving to facilitate machining of the parts.

It is another object of this invention to provide a gate valve of the above mentioned type with improved detachable valve seats which effectively seal the valve in both its open and closed positions, and also permit undue pressure in the housing to bleed into either side of the line when the valve is open and into the upstream side of the line when the valve is closed.

It is another object of this invention to provide a through conduit gate valve which has depending valve seat plates with readily removable means for maintaining the spacing between the lower ends of such plates within predetermined limits.

It is a further object of this invention to provide a through conduit gate valve of improved design which permits the use of a relatively thin, one-piece gate, and a correspondingly thin, or narrow, housing to thus provide sufficient clearance between the coupling flanges and the housing for proper bolting while maintaining small face-to-face dimensions between such flanges.

Other objects and advantages of the invention will become evident from the following description and accompanying drawings, in which:

Figure 1 is a view, principally in central vertical section, of a gate valve embodying this invention, with the valve shown in closed position.

Figure 2 is a sectional view taken substantially on line 2—2 of Figure 1. Portions of the valve gate are broken away to show details more clearly.

Figure 3:
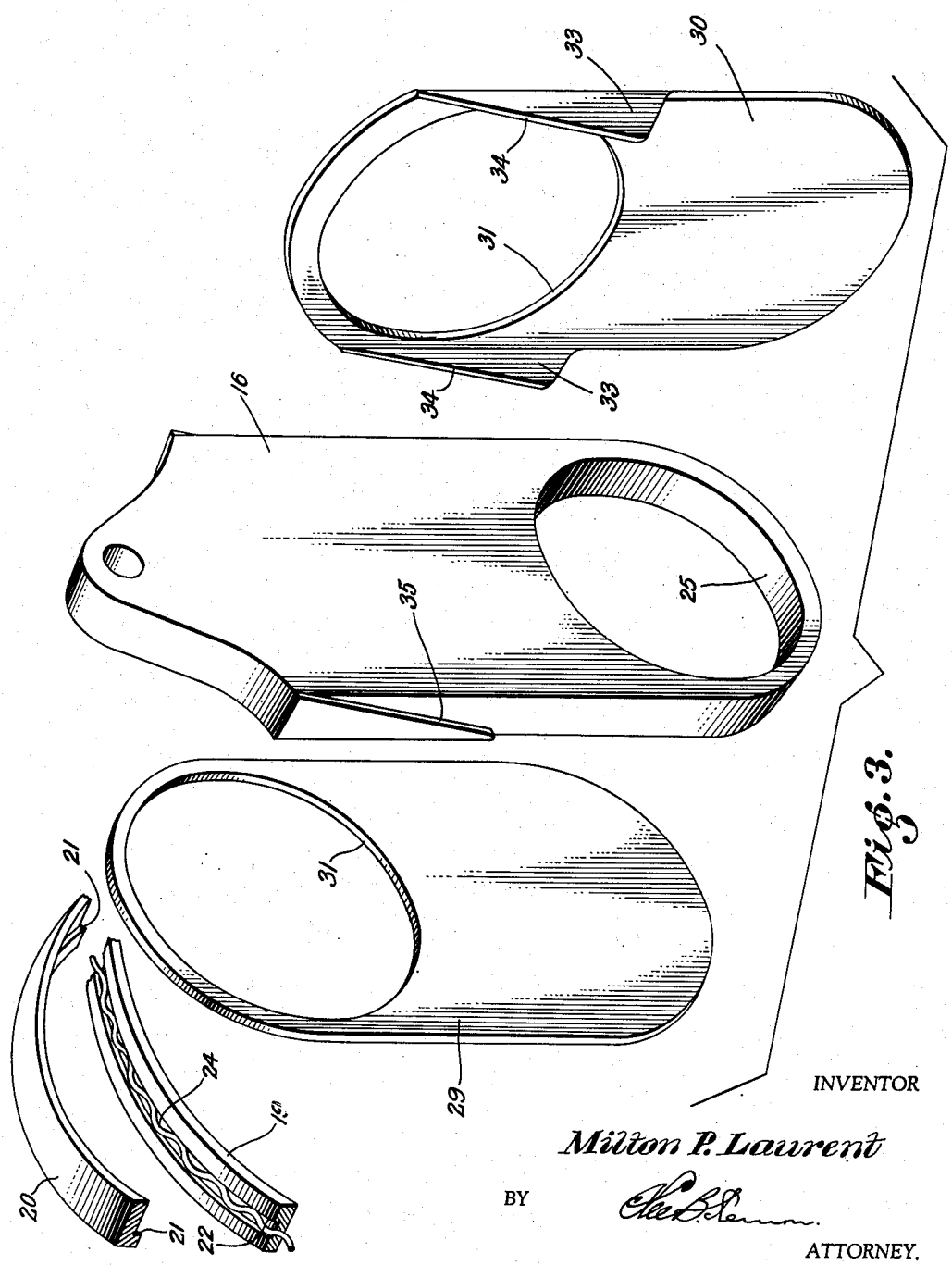
Figure 3 is an exploded perspective view of the valve gate and its valve seat plates. An enlarged fragmentary section of one of the valve seats is also shown.

Referring now to the drawings there is shown in Figures 1 and 2, a through conduit gate valve, having a housing 10 forming an interior valve chamber 11 in which are located the moving parts of the valve. The housing 10 is provided with aligned ports 12, 13 and the usual bolting or coupling flanges 14 at the outer ends of such ports for connecting the valve into a pipe line by means of bolts, as indicated at 15. A valve gate 16 is mounted within the chamber 11 for slideable movement between opposed hubs 17 that are formed on the interior of the housing about the inner ends of the ports 12, 13. The annular face of each hub 17 is counterbored, as at 18, to receive a detachable valve seat assembly. The latter comprises inner and outer, concentrically arranged, annular valve seats, 19, 20 respectively, of equal axial length. The outer seats 20 are of uniform outer diameter and are secured in the hub counterbores 18 by a pressed fit, leaving a portion of the seat annulus projecting out of the counterbore. The inner seats 19 are of uniform inner diameter and are telescopingly mounted with a free sliding fit within their respective outer seats 20. The hub-engaged ends of the outer seats have inner shoulders 21 and the other ends of the inner seats have outer shoulders 22 (see Figure 3), thus forming an annular chamber 23 between the two valve seats when they are assembled as shown in Figure 1. Disposed within this chamber 23 is an annular serpentine spring 24 that bears oppositely against the shoulders 21, 22 to thereby continuously urge the inner seats 19 into sealing engagement with opposite sides of the valve gate. 16. These inner seats 19 are of relatively light construction and, hence, are somewhat expansible under appropriate forces for reasons later described.

The valve gate 16 is of one-piece construction, and has a port 25 which is adapted to be aligned with the housing ports 12, 13 in the open position of the valve to permit unobstructed flow therethrough. The upper end of the gate 16 is connected to the lower end of a valve stem 26 by means of a fork 27 and pin 28 connection. This connection is constructed to allow some play between the stem 26 and the gate 16 in directions perpendicular to the valve seats, for reasons which later become evident. The valve stem 16 extends upwardly through a bonnet (not shown) for operation by any conventional means, such as a handwheel (not shown) rotation of which will raise and lower the gate to open and close the valve.

Mounted on the projecting portion of each valve seat assembly are seat plates, or skirts 29, 30, which have circular apertures 31 snugly embracing their respective outer valve seats 20. The width of these plates 29, 30 is substantially equal to, or slightly less than, the axial length of the projecting portion of the outer seats 20, for reasons which later become obvious. The seat plates 29, 30 depend into the lower portion of the valve chamber 11 closely adjacent both sides of the gate 16 and into close proximity with the integral rounded bottom 32 of the housing 10 to thereby protect the gate port 25, when the gate is closed, and also function as guides for the gate. The downstream plate 29 is plain and flat, as best shown in Figure 3. The upstream plate 30, however, is provided with side flanges 33 disposed closely adjacent opposite lateral sides of the gate. These flanges 33, together with the valve seats 19, 20 and the opposed inner flat surfaces of the plates 29, 30, serve to confine and guide the gate in its substantially rectilinear movement.

The plate flanges 33 are tapered, as shown, to provide longitudinal edges 34 which are inclined with respect to the valve seats. Similarly inclined ledges 35 on opposite lateral sides of the valve gate cooperate with the plate flange edges 34 to form wedging surfaces that are effective to force the gate tightly against the downstream valve seat assembly as the gate moves into closed position. Hence, the gate, when closed, is in tight sealing engagement with both of the downstream valve seats 19, 20, thus effecting a double seal for the low pressure side of the valve to more effectively prevent leakage therethrough. Since both the gate and the seat plates are separately manufactured for later assembly in the valve housing, the wedging surfaces 34, 35 can easily be machined before such assembly.

The thickness of the gate 16 is slightly (preferably about seven to ten one-thousandths of an inch .007" to .010") less than the spacing between the fixed outer valve seats 20. Hence, when the gate is closed a small clearance exists between the gate and the upstream fixed outer valve seat. The spring 24 in the upstream valve seat assembly, however, forces the upstream inner valve seat into sealing engagement with the gate. Additionally, since this upstream inner seat 19 is of relatively light construction, the line pressure on the upstream side of the valve, i. e. within the port 13, expands the upstream inner seat into sealing engagement with its outer seat. Hence, line pressure is prevented from entering the valve chamber 11 when the valve is closed. The same situation exists when the valve is open, that is, both the upstream and the downstream inner seats 19 sealingly engage opposite sides of the gate because of the springs 24 and also are expanded by line pressure into sealing engagement with their respective outer fixed seats. It is to be noted that this light expansible construction of the inner seats eliminates the need for packing or other type of auxiliary seal between the inner and outer valve seats.

The normally free-running fit of the inner valve seats 19, within their respective outer valve seats 20 provides sufficient clearance therebetween to permit pressure in the housing to bleed back through the seat assemblies into the line, in case housing pressure exceeds line pressure. Such pressure-equalizing bleeding can take place through both valve seat assemblies when the valve is open and through the upstream assembly when the valve is closed.

Loosely mounted in the bottom of the valve chamber 11 is a seat plate supporting block or shoe 36. This shoe has a rounded under surface 37, which conforms to the curvature of the bottom wall of the chamber 11, and a pair of upwardly projecting parallel flanges 38 which snugly engage the outer sides of the lower ends of the seat plates 29, 30. The inner sides of these flanges 38 are provided with plate-receiving recesses 39, having curved bottom edges 40 (Figure 2), that conform to the curvature of the lower ends of the plates 29, 30. The shoe has a central aperture or recess 41 in its undersurface 37 which fits loosely over a projecting lug 42 roughly cast on the bottom wall of the valve chamber to prevent the shoe from slipping laterally out of its plate-supporting position. The plate-receiving recesses 39 in the shoe are premachined to fixed dimensions and the shoe dropped into the housing in proper position over the lug 42 before the seat plates are assembled in the housing. After these plates are assembled the shoe prevents the bottom portion of the plates from flexing outwardly away from the gate. This shoe is maintained in position primarily by its engagement with the lower ends of the seat plates. In instances where the bottom wall of the housing and the bottom edge of the seat plates do not have a common lateral center of curvature, however, the interfitting lug and aperture construction is unnecessary to prevent the shoe from slipping out of position.

It will thus be seen that this invention has provided a simply constructed efficient gate valve which fulfills all the objects of the invention. It also will be seen that, although a specific embodiment of the invention has been shown and described, numerous variations thereof which retain the principles of the invention will be apparent to one skilled in the art. Therefore, this invention encompasses all changes and modifications which come within the spirit and scope of the following claims.

I claim:

1. A gate valve of the through conduit type comprising: a housing forming a valve chamber having aligned fluid ports; opposed parallel valve seats associated with said ports; a ported valve gate slideably mounted between said seats; means for moving said gate to open and close the valve; removable seat plates engaging said housing adjacent to said aligned fluid ports and positioned one on either side of said valve gate to protect the gate port when the valve is closed; and wedging means including an inclined surface on said gate and an inclined surface on one of said seat plates, said inclined surfaces making contact one with the other to force said gate into sealing engagement with one of said valve seats as said gate moves into closed position.

2. The structure defined in claim 1 in which the said one seat plate is on the upstream side of the valve and the gate is forced into sealing engagement with the downstream valve seat as said gate moves into closed position.

3. A gate valve of the through conduit type comprising: a housing forming a valve chamber having aligned fluid ports; opposed parallel valve seats associated with said ports; a ported valve gate slideably mounted between said seats; means for moving said gate to open and close the valve; removable seat plates engaging said housing adjacent to said aligned fluid ports and positioned one on either side of said valve gate to protect the gate port when the valve is closed; side flanges on opposite edges of at least one of said plates to confine and guide said valve gate during movement thereof to open and closed positions; and wedging means including an inclined surface on said gate and an inclined surface on the edges of said seat plate side flanges to form two sets of wedging surfaces effective to force said gate into sealing engagement with one of said valve seats as said gate moves into closed position.

4. A gate valve of the through conduit type comprising: a housing forming a valve chamber having aligned fluid ports; opposed parallel valve seats associated with said ports; a ported valve gate slideably mounted between said seats, each said valve seat including inner and outer telescoping sleeves, the outer sleeve being secured in a counterbore in said housing and projecting into said valve chamber; means defining an annular chamber between said sleeves; resilient means within said annular chamber for urging said inner sleeve axially into sealing engagement with said gate; means for moving said gate to open and close the valve; and wedge means, a part of which is carried by said gate and effective as the latter moves into closed position, for forcing said gate into sealing engagement with both the inner and the outer sleeves of one of said valve seats.

5. A gate valve of the through conduit type comprising: a housing forming a valve chamber having aligned fluid ports; opposed parallel valve seats associated with said ports; a ported valve gate slideably mounted between said seats, each said valve seat including inner and outer telescoping sleeves, the outer sleeve being secured in a counterbore in said housing and projecting into said valve chamber; and the inner sleeve being expansible by fluid pressure within the valve conduit and inner sleeve against the outer sleeve to provide a seal therebetween; the outer sleeve of the downstream valve seat being enageable with said valve gate; means defining an annular chamber between said sleeves; resilient means within said annular chamber for urging said inner sleeve axially into sealing engagement with said gate; and means for moving said gate to open and close the valve.

6. A gate valve of the through conduit type comprising: a housing forming a valve chamber having aligned fluid ports; opposed parallel valve seats associated with said ports; a ported valve gate slideably mounted between said seats; means connected to one end of said gate for moving the same to open and close the valve; removable seat plates engaging said housing adjacent to said aligned fluid ports and positioned one on either side of said valve gate to protect the gate port when the valve is closed, said plates extending into proximity with a wall portion of said valve chamber opposite the other end of said gate; a member removably mounted in said chamber adjacent said wall portion and having upstanding flanges to engage the outer end portion of said plates to prevent spreading thereof, and lug means between said chamber wall portion and said seat-plate-engaging member to anchor the latter in place.

MILTON P. LAURENT.

References Cited in the file of this patent

UNITED STATES PATENTS

| Number | Name | Date |
|--------|------|------|
| 783,953 | Henry | Feb. 25, 1905 |
| 1,049,450 | Caskey | Jan. 7, 1913 |
| 2,030,458 | McKellar | Feb. 11, 1936 |
| 2,230,600 | Olson | Feb. 4, 1941 |
| 2,253,881 | Anderson | Aug. 26, 1941 |
| 2,255,829 | Spang | Sept. 16, 1941 |
| 2,504,924 | Fennema | Apr. 18, 1950 |